April 5, 1932.    F. VAN D. LONGACRE    1,852,582

VALVE

Filed Aug. 2, 1929    2 Sheets-Sheet 1

INVENTOR.
Frederick V.D. Longacre
BY
HIS ATTORNEY.

April 5, 1932.  F. VAN D. LONGACRE  1,852,582
VALVE
Filed Aug. 2, 1929   2 Sheets-Sheet 2
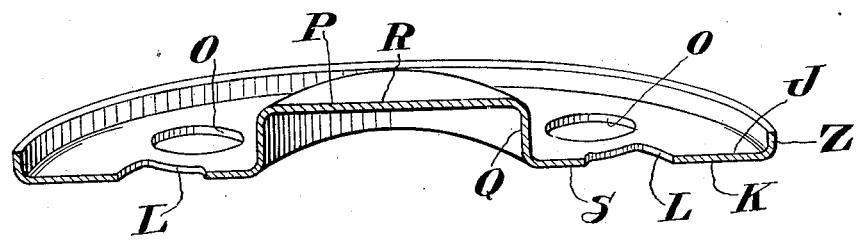
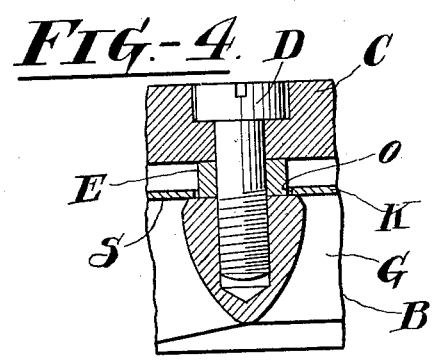
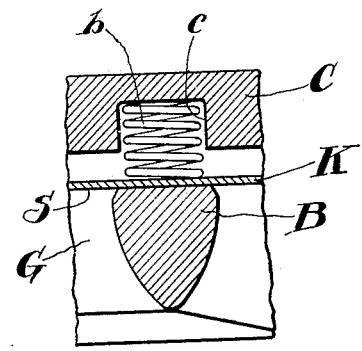
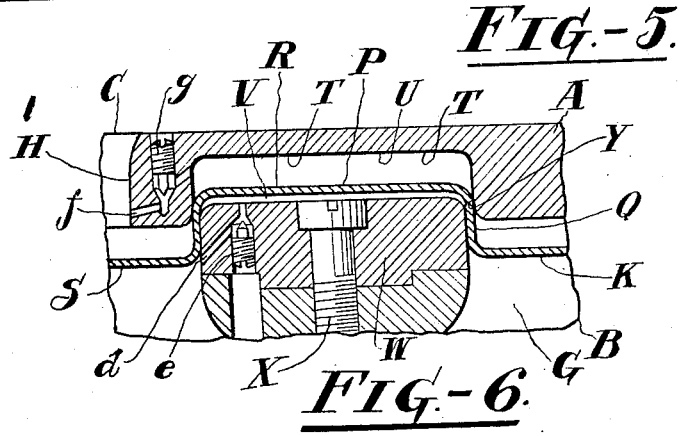
INVENTOR.
Frederick V. D. Longacre
BY
HIS ATTORNEY.

Patented Apr. 5, 1932

1,852,582

UNITED STATES PATENT OFFICE

FREDERICK VAN DUZER LONGACRE, OF YONKERS, NEW YORK, ASSIGNOR TO INGERSOLL-RAND COMPANY, OF JERSEY CITY, NEW JERSEY, A CORPORATION OF NEW JERSEY

VALVE

Application filed August 2, 1929. Serial No. 382,957.

This invention relates to valves, but more particularly to multi-ported plate valves adapted for use on compressors, pumps and the like, for controlling the admission of fluid into and the discharge of fluid from machines of this type.

One object of the invention is to cushion the valve both during the lifting movement and the retracting or seating movement.

Another object is to prevent fracture of the valve plate.

Other objects are to obtain a high lift of the valve, to avoid an abrupt change in the course of the fluid flowing therethrough, to simplify the construction of valves of this type, to render the valve plate rigid, and to enable the use of a valve plate of extremely small cross sectional area.

Other objects will be in part obvious and in part pointed out hereinafter.

Figure 1:
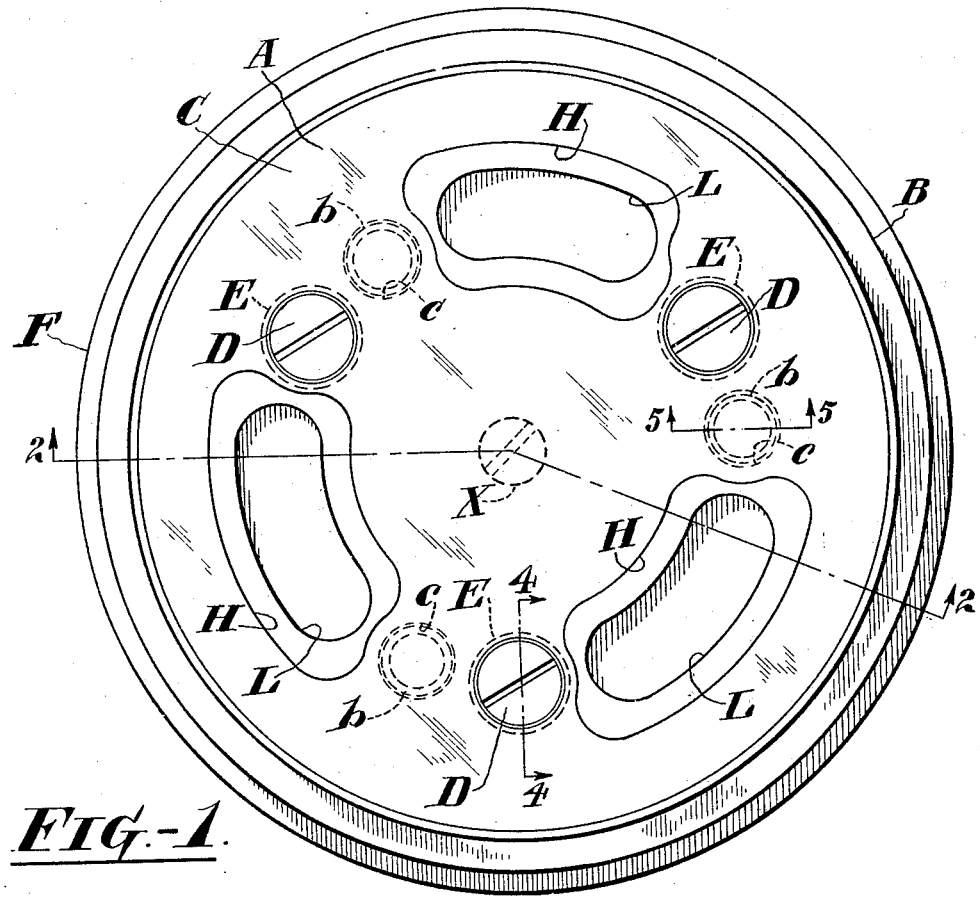
Figure 2:
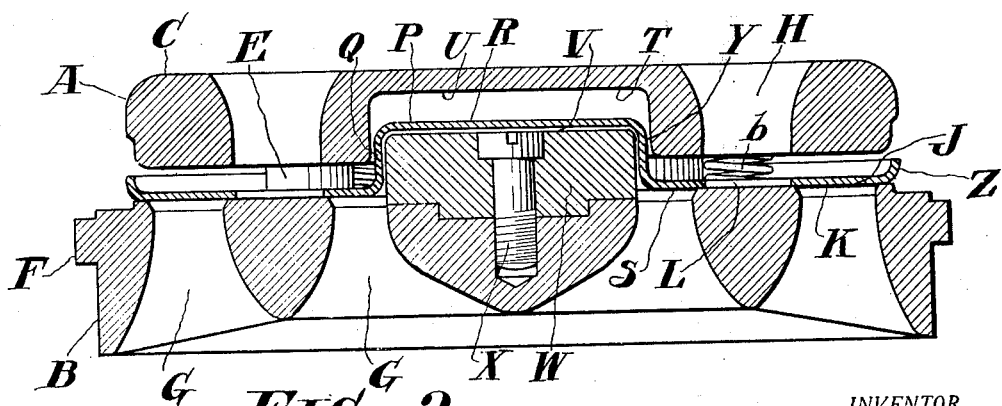

In the drawings illustrating the invention and in which similar reference characters refer to similar parts, Figure 1 is a top plan view of a plate valve constructed in accordance with the practice of the invention, Figure 2 is a sectional elevation taken through Figure 1 on the line 2—2 looking in the direction indicated by the arrows, Figure 3 is a perspective view of a portion of the valve plate, Figures 4 and 5 are sectional elevations of details taken through Figure 1 on the lines 4—4 and 5—5 looking in the directions indicated by the arrows, and Figure 6 is a view similar to Figure 2 showing a modification of the invention.

Referring more particularly to the drawings, A designates generally a plate valve comprising a valve seat B and a stop plate C which is superimposed upon the valve seat B and secured thereto in this instance by bolts D. The bolts D extend through the stop plate C and in this instance also through spacers E disposed between the stop plate and the valve seat and may be threaded into the valve seat B.

On the periphery of the valve seat B is an annular flange F for cooperation with the seating surface in a compressor or pump to which the valve may be applied, and in this instance the valve seat is provided with a plurality of ports G through which fluid may flow to or from a compressor, depending upon whether the valve is being used as an inlet valve or, as illustrated, a discharge valve. The stop plate C is also provided with a plurality of ports H to provide a passage for fluid issuing from the ports G. The stop plate C may be of somewhat smaller diameter than the valve seat B so that some of the fluid flowing through the ports G may also pass over the outer edge of the stop plate.

The end of the valve seat B adjacent the stop plate C serves as a seating surface J for a valve plate K adapted to reciprocate between the valve seat B and the stop plate to control the ports G in the valve seat. The valve plate K is provided with the usual ports L which, in the open position of the valve plate, are adapted to register with the ports H in the stop plate to permit the flow of fluid through the valve. As a convenient means of holding the valve plate K against rotary movement relatively to the valve seat B, said valve plate is provided with apertures O through which extend the spacers E. The apertures O are preferably of somewhat larger diameter than the spacers E so that normally there will be substantially no contact between the valve plate K and the spacers.

In accordance with the present invention means are provided for preventing the valve plate from impacting with undue force against the elements which limit its movement, such as the stop plate C and the valve seat B. To this end the valve plate K is provided with a raised portion or crown P centrally located on the valve and comprising a lateral flange Q and an imperforate end wall R which lies in a plane offset with respect to an annular seating portion S of the valve plate and in this instance extends into a recess T in the stop plate C. The end wall R is preferably an integral part of the lateral flange Q and divides the recess T into a pair of cushioning chambers U and V.

A closure is provided for the cushioning chamber V by a head or projection W formed in this instance as a separate piece and secured to the valve seat B by a screw X. The projection W extends into the crown P and is preferably of such height that a portion thereof also lies within the confines of the recess T.

In addition to the functions described, the projection W also serves to form an annular opening Y for the recess T to accommodate the lateral flange Q of the valve plate. In the drawings the proportion of the annular opening Y is somewhat exaggerated for the purpose of illustration. In practice the width of said opening may vary in accordance with the proportion of the valve assembly and the duty for which it is intended. In all cases the annular opening Y should be of such proportions that the flow of fluid into and from the chambers U and V will be somewhat restricted to assure a suitable cushioning action of such fluid against the end wall R of the valve plate.

In addition to serving as a means for controlling the flow of fluid to and from the chambers U and V the annular chamber Y also serves as a guide for the lateral flange Q which reciprocates in the annular opening Y and thus serves to maintain the valve plate in substantially the correct position with respect to the seating surface J.

In order to render the seating portion S of the valve plate K rigid said valve plate is provided at its outer edge with a curved portion or flange Z which may be of suitable height to prevent the extreme fibres of the valve plate K from impacting against the seating surface J. By thus providing the seating portion S of the valve with the lateral flanges Q and Z the valve plate will be materially reinforced so that it will not be flexed by the pressures to which it may be subjected and, in consequence, a valve plate of small cross sectional area and consequent light weight may be used.

If desired additional cushioning means in the form of springs $b$ may be interposed between the valve plate K and the stop plate C. In the present instance the stop plate C is provided with sockets $c$ to act as guides for the springs $b$.

In the operation of the device so far described, fluid compressed by the mechanism to which the valve may be applied flows through the ports G of the valve seat to act against the annular seating portion S of the valve plate K for raising the said valve plate from the seating surface J. The compressed fluid then flows through the ports L in the valve plate and the ports H of the stop plate as well as around the outer edges of the valve plate and the stop plate.

During the opening of the valve plate its movement will be opposed by fluid in the chamber U acting against the end wall R and by a vacuum drawn in the chamber V. In this way the valve plate acts against both a positive and a negative cushioning pressure and the valve plate K will be moved against the stop plate C without severe impact.

Upon the completion of the discharge stroke of the machine to which the valve may be applied the springs together with the pressure previously discharged through the valve will act against the upper surface of the valve plate to again return it to the seating surface J. During the subsequent retracting movement of the valve plate the fluid previously admitted into the chamber V will be compressed and will be gradually forced from the said chamber V through the annular space between the lateral flange Q and the projection W. Such fluid pressure will be augmented by the negative pressure existing in the chamber U for opposing the movement of the valve plate and in consequence, the valve plate will be returned to the seating surface J with only sufficient force to assure a fluid tight seal between these elements.

From the foregoing it will be readily seen that the movement of the valve plate will be adequately cushioned throughout its entire stroke. This is due to the fact that the parts comprising the cushioning element of the valve are so constructed that fluid will be constantly discharged from or admitted into the chambers U and V throughout the entire stroke of the valve plate instead of so controlling the flow of fluid into and from the chambers U and V in such manner as to afford a rapid initial movement of the valve plate and a retardation thereof as the valve plate approaches its limiting positions.

In the modification illustrated in Figure 6 the annular opening Y between the projection and the wall of the recess T is only of such cross sectional area as to slidably accommodate the lateral flange Q of the valve plate K. In other words, the lateral flange Q cooperates with the elements forming the opening Y to seal the recess at that point.

Adjustable means are provided for controlling the admission and exhaust of fluid into and from the chambers U and V. The projection W is accordingly provided with a passage $d$ which may lead from one of the ports G through the projection W to open into the chamber V and a needle valve $e$ is threaded into the projection W to control the said passage $d$. In like manner the stop plate $c$ is provided with a passage $f$ which leads from a port H in the stop plate to the chamber U, and a needle valve $g$ is threaded into the stop plate to control the flow of fluid through the passage $f$.

In this modification the cushioning effect on the valve plate K is substantially the same as in the modification previously described and differs only therefrom chiefly in that the amount of fluid admitted into the chambers U and V or its discharge therefrom may be varied in accordance with immediate requirements.

In practice, the present invention has been found to be a highly efficient device. This is due largely to the fact that the construction shown imposes no limitations on the degree of lift of the valve plate. Being adequately protected against destructive impact upon the elements which limit its movement, the valve plate is also capable of a very high speed of reciprocation as compared with the present known valves.

As will be observed, the valve plate is suitably guided and in most positions which it may occupy in practice the lift of the valve plate will be substantially uniform throughout. Inasmuch however, as valves as applied to compressors are frequently required to assume inclined positions and in view of the fact that some clearance may exist between the lateral flange Q of the valve plate and the elements which form a guide therefore, it may be possible for the valve plate to tilt slightly, both during the lifting and the return movement of the valve. When operating under these conditions the outermost point of contact of the valve plate with the stop plate C and the valve seat B will be the curved portion Z and those portions of the valve plate, namely, the extreme outer fibres, at which point fractures in valves of the type usually start will be protected against impacting against these elements. In consequence the valve plate will be required to withstand only the ordinary wear which may result from repeated seating against the stop plate and the valve seat.

Although I have shown only two modified forms of the invention I do not wish to be limited to the particular constructions illustrated as, obviously, the invention is susceptible of a considerable degree of modification, both with respect to the proportions and the arrangement of the various elements without departing from the spirit of the invention or the scope of the claims.

I claim:

1. A multi-ported valve for compressors and the like, comprising a valve seat, a stop plate having a recess, and a valve plate reciprocable between the valve seat and the stop plate having a crown extending into the recess to act against cushioning fluid in the recess for cushioning the opening and closing movements of the valve plate.

2. A multi-ported valve for compressors and the like, comprising a valve seat, a stop plate having a recess, a valve plate reciprocable between the valve seat and the stop plate, and a crown on the valve plate extending into the recess to guide the valve and to entrap fluid in the recess for cushioning the opening and closing movements of the valve plate.

3. A multi-ported valve for compressors and the like, comprising a valve seat, a stop plate having a recess, a valve plate reciprocable between the valve seat and the stop plate, and an imperforate crown in the central portion of the valve plate and extending into the recess to act against cushioning fluid therein for cushioning the opening and closing movements of the valve plate.

4. A multi-ported valve for compressors and the like, comprising a valve seat, a stop plate having a recess, a valve plate having a crown extending into the recess to act against cushioning fluid therein for cushioning the movement of the valve plate in one direction, and means extending into the crown to act against fluid therein for cushioning the return movement of the valve.

5. A multi-ported valve for compressors and the like, comprising a valve seat, a stop plate having a recess, a valve plate reciprocable between the stop plate and the valve seat, a crown in the central portion of the valve plate and extending into the recess to act against fluid therein for cushioning the lift of the valve, and a projection on the valve seat extending into the crown to act against fluid therein for cushioning the return movement of the valve plate.

6. A multi-ported valve for compressors and the like, comprising a valve seat, a stop plate having a central recess, a projection on the valve seat extending into the recess and forming an annular opening for the recess, a valve plate reciprocable between the valve seat and the stop plate, an annular flange on the valve plate to control the admission and exhaust of fluid into and from the recess, and an end wall integral with the flange to act against fluid in the recess for cushioning the opening and closing movements of the valve plate.

7. A multi-ported valve for compressors and the like, comprising a valve seat, a stop plate, a valve plate reciprocable between the valve seat and the stop plate, a crown on the valve plate to form a chamber, and means extending into the chamber and being of slightly smaller diameter than the chamber to permit a restricted flow of fluid into and out of the chamber for cushioning the opening and closing movements of the valve plate.

8. A multi-ported valve for compressors and the like, comprising a valve seat, a stop plate, a valve plate reciprocable between the valve seat and the stop plate, a crown on the valve plate to form a chamber, and means associated with the valve seat and extending into the chamber to control the flow of cushioning fluid into the chamber and to act against such fluid for cushioning the opening and closing movements of the valve plate.

9. A multi-ported valve for compressors and the like, comprising a valve seat, a stop plate, a valve plate reciprocable between the valve seat and the stop plate having a crown to form a cushioning chamber, and a projection on the valve seat controlling the flow of the cushioning fluid in the chamber, said projection extending into the crown to guide the valve and to act against fluid in the chamber for cushioning the opening and closing movements of the valve plate.

10. A multi-ported valve for compressors and the like, comprising a valve seat, a stop plate having a recess, means forming a head for the open end of the recess, a valve plate comprising a seating portion and an end wall offset with respect to the seating portion to divide the recess into a pair of chambers, and means for controlling the admission and exhaust of fluid into the chambers for cushioning the movement of the valve plate.

11. A multi-ported valve for compressors and the like, comprising a valve seat, a stop plate having a recess, a valve plate having an imperforate crown extending into the recess, and means extending into the crown to act against fluid therein for cushioning the return movement of the valve.

12. A multi-ported valve for compressors and the like, comprising a valve seat, a stop plate having a recess, a projection on the valve seat extending into the recess and forming an annular opening therefor, a valve plate movable back and forth between the valve seat and the stop plate and having a crown extending into the recess to form a pair of cushioning chambers therein, said crown having sides dividing the annular opening of the recess into restricted annular spaces for the gradual entrance and exhaust of fluid to and from the chambers, whereby the movements of the valve plate in each direction will be opposed by a positive pressure in one chamber and a negative pressure in the other.

In testimony whereof I have signed this specification.

FREDERICK VAN DUZER LONGACRE.